United States Patent
Oooka et al.

(10) Patent No.: US 10,053,087 B2
(45) Date of Patent: Aug. 21, 2018

(54) DRIVING ASSISTANCE APPARATUS

(71) Applicant: DENSO CORPORATION, Kariya, Aichi-pref. (JP)

(72) Inventors: Masao Oooka, Gamagori (JP); Takahiro Narita, Nagoya (JP); Noriyasu Noto, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/722,232

(22) Filed: May 27, 2015

(65) Prior Publication Data

US 2015/0344027 A1 Dec. 3, 2015

(30) Foreign Application Priority Data

May 30, 2014 (JP) .................. 2014-112902

(51) Int. Cl.

| | |
|---|---|
| *B60W 30/00* | (2006.01) |
| *B60W 50/14* | (2012.01) |
| *G01C 21/26* | (2006.01) |
| *B60W 50/00* | (2006.01) |
| *B60W 30/10* | (2006.01) |
| *B60W 30/14* | (2006.01) |
| *G01C 21/20* | (2006.01) |

(52) U.S. Cl.
CPC ............ *B60W 30/00* (2013.01); *B60W 30/10* (2013.01); *B60W 30/14* (2013.01); *B60W 50/0097* (2013.01); *B60W 50/14* (2013.01); *G01C 21/26* (2013.01); *B60W 2550/402* (2013.01); *G01C 21/20* (2013.01)

(58) Field of Classification Search
CPC ....... B60W 30/00; B60W 50/14; G01C 21/26; G01C 21/20
See application file for complete search history.

(56) References Cited

U.S. PATENT DOCUMENTS

| | | | |
|---|---|---|---|
| 2007/0265760 A1* | 11/2007 | Konhauser | ......... B60K 31/0008 701/97 |
| 2010/0125386 A1* | 5/2010 | Ibrahim | ................ B60W 50/14 701/36 |
| 2011/0043635 A1 | 2/2011 | Fujita et al. | |

(Continued)

FOREIGN PATENT DOCUMENTS

| | | |
|---|---|---|
| JP | 2000-149188 A | 5/2000 |
| JP | 2003-146162 A | 5/2003 |

(Continued)

*Primary Examiner* — Alan D Hutchinson
(74) *Attorney, Agent, or Firm* — Harness, Dickey & Pierce, P.L.C.

(57) ABSTRACT

A driving assistance apparatus includes a position obtaining unit, an evaluation value obtaining unit, and a notifying unit. The position obtaining unit obtains a position of an own vehicle. The evaluation value obtaining unit obtains an evaluation value indicating a degree by which driving assistance can be suitably performed on the own vehicle in a travelling area through which the own vehicle is presumed to travel based on the position of the own vehicle obtained by the position obtaining unit. The notifying unit gives notification in advance to a notification apparatus, of the evaluation value obtained by the evaluation value obtaining unit before the own vehicle enters the travelling area.

7 Claims, 4 Drawing Sheets

(56) References Cited

U.S. PATENT DOCUMENTS

| | | | |
|---|---|---|---|
| 2012/0046819 A1* | 2/2012 | Agrawal | G06Q 10/047 701/25 |
| 2012/0296539 A1* | 11/2012 | Cooprider | B60W 10/06 701/70 |
| 2013/0030657 A1* | 1/2013 | Chatterjee | B60W 50/08 701/46 |
| 2014/0049646 A1* | 2/2014 | Nix | B60R 1/002 348/148 |
| 2015/0253772 A1* | 9/2015 | Solyom | G05D 1/0212 701/25 |
| 2016/0082978 A1* | 3/2016 | Ozaki | G01C 21/34 701/58 |
| 2016/0096531 A1* | 4/2016 | Hoye | B60W 50/14 701/23 |

FOREIGN PATENT DOCUMENTS

| | | |
|---|---|---|
| JP | 2003-205805 A | 7/2003 |
| JP | 2004-126888 A | 4/2004 |
| JP | 2010-000951 A | 1/2010 |
| JP | 2010-173601 A | 8/2010 |
| WO | WO 2009/107210 | 9/2006 |

\* cited by examiner

| POSITION | ASSISTANCE TYPE | EVALUATION VALUE |
|---|---|---|
| A | PCS | 2 |
| B | ACC | 5 |
| C | LKA | 4 |

DRIVING ASSISTANCE APPARATUS

CROSS-REFERENCE TO RELATED APPLICATION

This application is based on and claims the benefit of priority from Japanese Patent Application No. 2014-112902, filed May 30, 2014, the disclosure of which is incorporated herein in its entirety by reference.

BACKGROUND

Technical Field

The present disclosure relates to a technology for controlling driving assistance performed on an own vehicle.

Related Art

A technology for analyzing, as a road condition under which a vehicle is travelling, the complexity level of the shape of the road on which the vehicle is travelling, based on images captured by an on-board camera and the like, is publicly known (refer to, for example, WO 2009/107210).

In addition, performing driving assistance, such as adaptive travel control (ACC), lane keep assist (LKA), and pre-crash safety (PCS), on a vehicle while the vehicle is travelling is also known.

Driving assistance is performed based on recognition results of the recognition of the travelling environment of a travelling area, such as the road on which the vehicle is travelling, and the operating state of the vehicle, based on image data picked up by an on-board camera, as described in the re-publication of WO 2009/107210, or based on detection results from various sensors including a radar.

However, depending on the travelling environment of the travelling area in which the vehicle is travelling, for example, paint or dirt on the road surface may be erroneously recognized as a person, a lane division line, or the like. In addition, when a portion of the road surface on an uphill road is covered by a metal plate, the metal surface may be erroneously recognized as a preceding vehicle when objects ahead of the vehicle are scanned by the radar or the like. Moreover, a white line that demarcates travelling lanes may be erroneously recognized as not being present because a portion of the white line has faded.

Furthermore, when the road shape is complex, the road surface is rough and bumpy (uneven), or the road is greatly sloped in a lateral direction in relation to the travelling direction of the vehicle, the detection results from the sensors and the driving operations by the driver may not match.

In this way, when driving assistance is performed based on the recognition results of the recognition of the travelling environment of the travelling area of the vehicle and the operating state of the vehicle, based on the detection results from various sensors, suitable driving assistance may not be performed.

SUMMARY

It is thus desired to provide a driving assistance apparatus that suitably controls driving assistance based on a travelling area of a vehicle.

An exemplary embodiment provides a driving assistance apparatus that includes position obtaining means, evaluation value obtaining means, and notifying means. The position obtaining means obtains a position of an own vehicle. The evaluation value obtaining means obtains an evaluation value (assistance reliability value) indicating a degree by which driving assistance can be suitably performed on the own vehicle in a travelling area through which the own vehicle is presumed to travel based on the position of the own vehicle obtained by the position obtaining means. The notifying means gives notification in advance to a notification apparatus, of the evaluation value obtained by the evaluation value obtaining means before the own vehicle enters the travelling area.

According to this configuration, notification of the evaluation value of the travelling area through which the own vehicle is presumed to travel is given in advance before the own vehicle enters the travelling area. Therefore, the driver can take measures based on the evaluation value of which notification has been given.

For example, when the evaluation value of which notification has been given is low, the driver can know in advance that there is a possibility that unsuitable driving assistance will be performed because the own vehicle is entering a travelling area that has a low evaluation value. The driver can then take appropriate measures. For example, the driver can turn off an execution switch for driving assistance in advance to prevent unsuitable driving assistance from being performed.

The evaluation value that indicates the degree by which driving assistance can be suitably performed is low in a travelling area in which, for example, an erroneous recognition of a person, a lane division line, or the like may be made because of paint or dirt on a road surface, an erroneous recognition of a preceding vehicle may be made when a radar or the like scans for an object ahead because a portion of the road surface on an uphill road is covered by a metal plate, or an erroneous recognition that a white line that demarcates travelling lanes is not present may be made because a part of the white line has faded.

In addition, the evaluation value is low when the travelling area is that in which the road surface is rough and bumpy (uneven), or detection results from sensors and the driving operation by the driver do not match because a lateral-direction slope is large in relation to the advancing direction of the vehicle.

Another exemplary embodiment provides a driving assistance apparatus that includes position obtaining means, evaluation value obtaining means, and assistance level determining means. The position obtaining means obtains a position of an own vehicle. The evaluation value obtaining means obtains an evaluation value indicating a degree by which driving assistance can be suitably performed on the own vehicle in a travelling area of the own vehicle including the position of the own vehicle obtained by the position obtaining means. The assistance level determining means determines an assistance level indicating the degree by which driving assistance is performed on the own vehicle based on the evaluation value obtained by the evaluation value obtaining means.

According to this configuration, the assistance level indicating the degree by which driving assistance is performed on the own vehicle is determined based on the evaluation value indicating the degree by which driving assistance on the own vehicle can be suitably performed in the travelling area of the own vehicle. Therefore, driving assistance of a suitable assistance level based on the evaluation value can be determined.

For example, when a command is issued to perform PCS as driving assistance in a travelling area that is unsuitable for driving assistance, driving assistance of a suitable assistance level, such as reducing the braking force for avoiding collision or not applying the braking force, can be determined.

DESCRIPTION OF EMBODIMENTS

Figure 1:
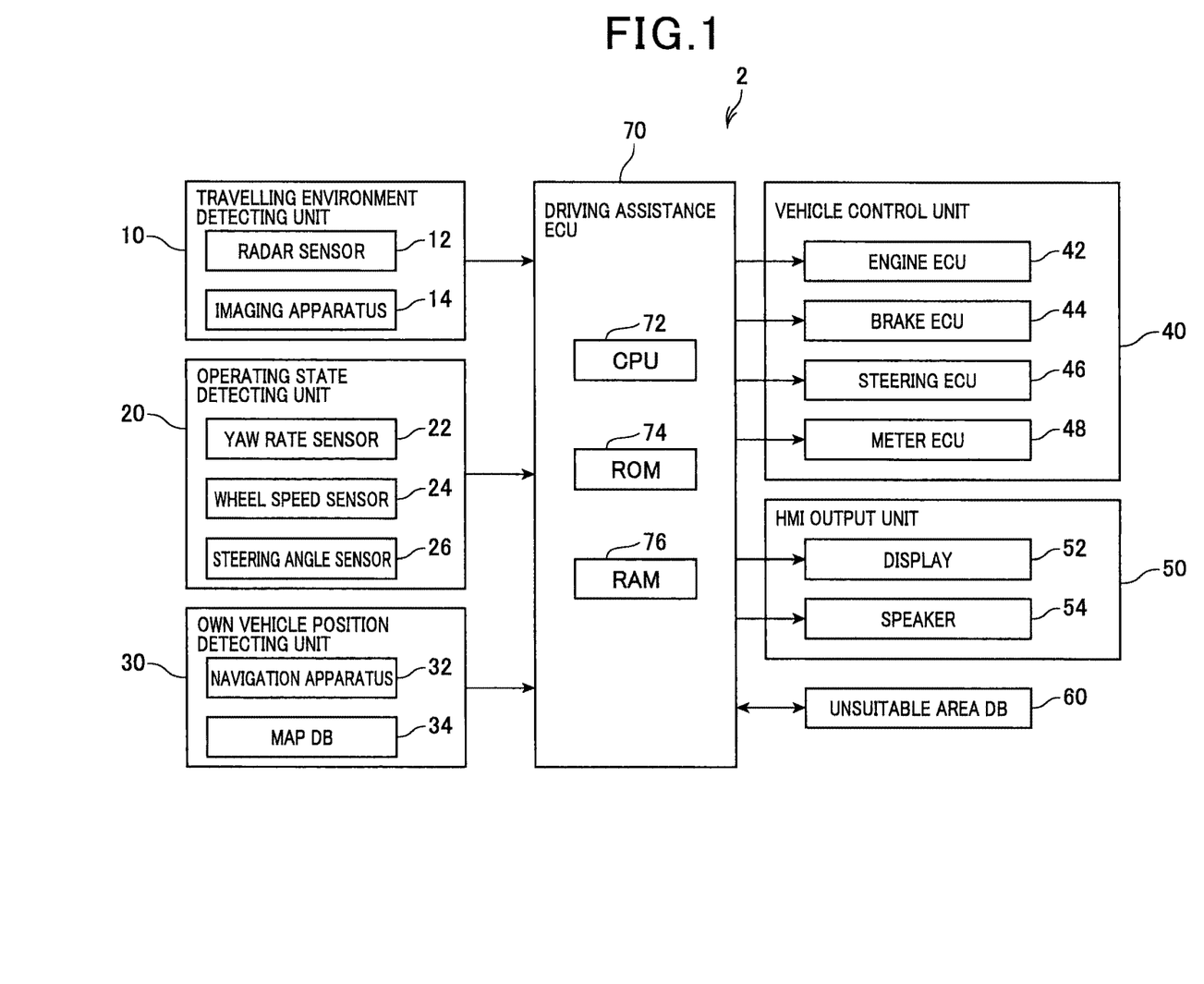
FIG. 1 is a block diagram of an overall configuration of a driving assistance system to which a driving assistance apparatus according to an embodiment is applied.

An embodiment to which the present invention is applied will hereinafter be described with reference to the drawings.
[Configuration]
A driving assistance system 2, shown in FIG. 1, is mounted in a vehicle and performs driving assistance on a vehicle. The driving assistance system 2 performs, for example, PCS, ACC, and LKA as driving assistance.

The driving assistance system 2 includes a travelling environment detecting unit 10, an operating state detecting unit 20, an own vehicle position detecting unit 30, a vehicle control unit 40, a human machine interface (HMI) output unit 50, an unsuitable area database (DB) 60, and a driving assistance electronic control unit (ECU) 70.

The travelling environment detecting unit 10 detects the environment of a travelling area, such as the road on which the own vehicle is travelling. The travelling environment detecting unit 10 includes a radar sensor 12 and an imaging apparatus 14.

The radar sensor 12 detects the position of an object that has reflected probe waves, based on the results of transmission and reception the probe waves. The radar sensor 12 according to the present embodiment is a radar that outputs millimeter waves, laser light, or the like as the probe waves such as to scan an area of a predetermined angle ahead of the vehicle, and detects reflected waves of the probe waves. The radar sensor 12 detects, as the position of the object, distance measurement data and angle measurement data that indicate the distance to the object and the direction in which the object that has reflected the probe waves is present, based on the amount of time required for the probe wave to travel to and from the object that has reflected the probe waves.

The radar sensor 12 is not limited to that which uses millimeter waves or laser light as the probe waves, and may be a sonar that uses ultrasonic waves as the probe waves.

The imaging apparatus 14 is a known camera that is mounted in the own vehicle to capture images over a predetermined angular range in the advancing direction of the own vehicle. The predetermined angular range herein refers to an angular range that includes the travelling road on which the own vehicle is travelling and signs set on the travelling road.

The operating state detecting unit 20 detects various types of information indicating the behavior of the own vehicle during travelling. The operating state detecting unit 20 includes a yaw rate sensor 22, a wheel speed sensor 24, and a steering angle sensor 26.

The yaw rate sensor 22 outputs a signal based on the turning angular velocity (yaw rate) $\gamma$ of the own vehicle.

The wheel speed sensor 24 is attached to each of the front left wheel, the front right wheel, the rear left wheel, and the rear right wheel, and outputs pulse signals in which edges are generated per predetermined angle based on the rotation of each wheel shaft, or in other words, outputs pulse signals having a pulse interval based on the rotation speed of the wheel shaft.

The steering angle sensor 26 outputs signals based on the amount of change in the steering angle as a relative steering angle of the steering wheel, or the actual steering angle with reference to the steering position during straight-ahead travelling as an absolute steering angle of the steering wheel.

The own vehicle position detecting unit 30 detects the position of the own vehicle. The own vehicle position detecting unit 30 includes a navigation apparatus 32 and a map DB 34.

The navigation apparatus 32 detects the latitude and longitude of the position of the own vehicle based on positioning signals from a global positioning system (GPS) satellite, and maps the position on a map obtained from the map DB 34. In addition, the navigation apparatus 32 retrieves the route on which the own vehicle is travelling based on the position of the own vehicle and an inputted destination.

The vehicle control unit 40 includes, as ECUs that control the various on-board units mounted in the vehicle, an engine ECU 42, a brake ECU 44, a steering ECU 46, and a meter ECU 48. Each ECU is configured mainly by a microcomputer that includes a central processing unit (CPU), a read-only memory (ROM), a random access memory (RAM), and the like.

The engine ECU 42 controls start and stop of an engine, a fuel injection amount, an ignition timing, and the like. Specifically, the engine ECU 42 controls an actuator that opens and closes a throttle provided in an intake pipe, based on detection values from a sensor that detects the depression amount of an accelerator pedal. In addition, the ECU 42 controls the throttle actuator so as to increase and decrease the driving force of the engine based on commands from the driving assistance ECU 70.

The brake ECU 44 controls braking of the own vehicle. Specifically, the brake ECU 44 controls an actuator that opens and closes a pressure-increase control valve and a pressure-decrease control valve provided in a brake hydraulic circuit, based on detection values from a sensor that detects the depression amount of a brake pedal. In addition, the brake ECU 44 controls the brake actuator so as to increase and decrease the braking force of the own vehicle based on commands from the driving assistance ECU 70.

The steering ECU 46 controls the steering angle of the own vehicle. Specifically, the steering ECU 46 controls an actuator that adjusts the steering angle of steering based on commands from the driving assistance ECU 70. As a result of control by the steering ECU 46, the own vehicle is controlled so as to travel along a travelling lane.

The meter ECU 48 performs display control of a meter display provided in the own vehicle, based on commands from each unit of the vehicle including the driving assistance ECU 70. Specifically, the meter ECU 48 displays, in the meter display, the vehicle speed, the engine rotation frequency, the execution state of control performed by the driving assistance ECU 70, and the details of driving assistance.

The HMI output unit 50 includes a display 52 and a speaker 54. The display 52 displays the own vehicle position or a planned travelling route of the own vehicle based on commands from the navigation apparatus 32. In addition, when the driving assistance ECU 70 performs driving assistance on the own vehicle, the display 52 is also used to display that the travelling area is an unsuitable travelling area. The display 52 and the speaker 54 act as a notification apparatus of the present disclosure.

The speaker 54 is used when route guidance by the navigation apparatus 32 is performed using audio. In addition, when the driving assistance ECU 70 performs driving assistance on the own vehicle, the speaker 54 is also used to give audio notification that the travelling area is a travelling area unsuitable for driving assistance (also referred to, hereafter, as an unsuitable area).

The unsuitable area DB 60 stores and registers therein unsuitable areas in which the driving assistance ECU 70 is not able to perform suitable driving assistance processes.

Figure 2:
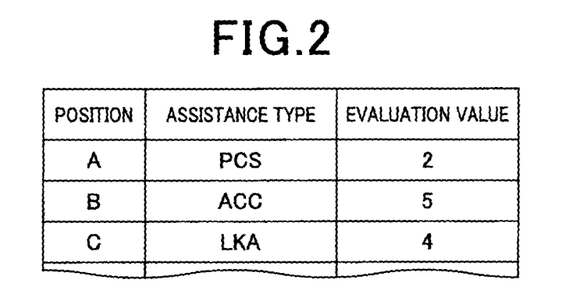
FIG. 2 is a configuration diagram showing a data structure of an unsuitable area DB.

As shown in FIG. 2, in the columns for the unsuitable areas registered in the unsuitable area DB 60, the position of the unsuitable area in which the latitude and longitude of the unsuitable area are linked with the map DB 34, the type of driving assistance process, such as PCS, ACC, and LKA, that cannot be suitably performed in the unsuitable area, and an evaluation value (assistance reliability value) that indicates the degree by which the driving assistance process can be suitably performed are stored and registered. The evaluation value becomes lower as the unsuitable area becomes more unsuitable for driving assistance.

Registration of the unsuitable area to the unsuitable area DB 60 may be performed based on determination by the driving assistance ECU 70 itself, or may be periodically performed by a car dealer or the like. In addition, when a travelling area is known in advance to be unsuitable for driving assistance, based on the road shape, the geography, or the like, an unsuitable area such as this may be registered in the unsuitable area DB 60 in advance. In addition, a passenger may directly register an unsuitable area in the unsuitable area DB 60.

Furthermore, a travelling area that has been determined to be an unsuitable area by another vehicle may be obtained by the own vehicle through inter-vehicle communication and registered in the unsuitable area DB 60. In addition, an unsuitable area registered in a road-side apparatus may be obtained by the own vehicle through road-to-vehicle communication and registered in the unsuitable area DB 60. The unsuitable area DB 60 acts as storage apparatus of the present disclosure.

The travelling environment of a travelling area may become unsuitable for driving assistance depending on the weather or the time period. Therefore, the weather and the time period during which a travelling area becomes unsuitable may be added to the fields for the unsuitable areas registered in the unsuitable area DB 60.

The driving assistance ECU 70 is configured mainly by a known microcomputer that includes at least a CPU 72, a ROM 74, and a RAM 76. The ECU 72 performs various processes based on control programs that are stored in the ROM 74 or the RAM 76. The ROM 74 stores therein control programs that enable the driving assistance ECU 70 to perform a driving assistance process in which driving assistance is performed on the own vehicle based on signals obtained from the travelling environment detecting unit 10 and the operating state detecting unit 20. The RAM 76 temporarily stores therein the control programs and data.

In addition to the above, the driving assistance ECU 70 includes an input and output interface (I/O) to which signals from the travelling environment detecting unit 10 and the operating state detecting unit 20 are inputted, and a communication circuit for communicating with other ECUs, such as the engine ECU 42, the brake ECU 44, the steering ECU 46, and the meter ECU 48. In the present embodiment, the driving assistance ECU 70 acts as the driving assistance apparatus of the present disclosure.

[Functional Block]

Figure 3:
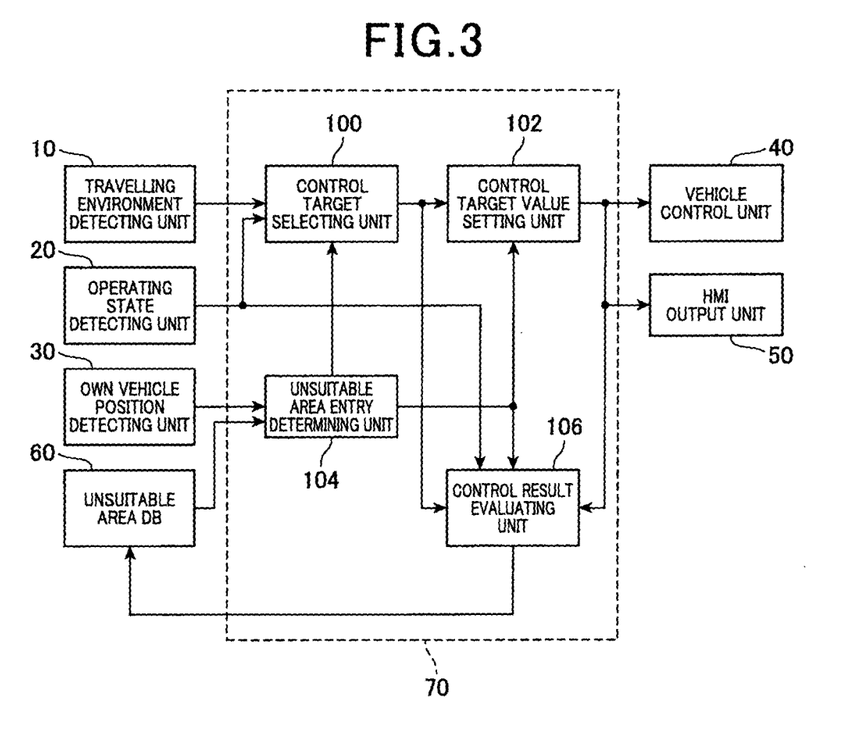
FIG. 3 is a functional block diagram of the driving assistance apparatus.

FIG. 3 shows a functional block of the driving assistance process performed by the driving assistance ECU 70. The driving assistance ECU 70 functions as a control target selecting unit 100, a control target value setting unit 102, an unsuitable area entry determining unit 104, and a control result evaluating unit 106, by executing the control programs stored in the ROM 74. Constituent sections that are essentially the same as those in FIG. 1 are given the same reference numbers.

The control target selecting unit 100 selects, as a control target for driving assistance, any of objects ahead of the own vehicle in the advancing direction for PCS, a preceding vehicle traveling ahead of the own vehicle in the advancing direction in the same vehicle lane as the own vehicle for ACC, and lane division lines in LKA, based on the travelling environment of the travelling area of the own vehicle detected by the travelling environment detecting unit 10 and the operating state of the own vehicle detected by the operating state detecting unit 20. The control target selecting unit 100 then outputs the selected control target to the control target value setting unit 102.

The control target value setting unit 102 sets control target values for performing driving control regarding the control target selected by the control target selecting unit 100 and issues a command to the vehicle control unit 40. For example, when ACC is performed, the control target value setting unit 102 sets the control target values of the throttle opening degree, fuel injection amount, and braking force of the brake in the vehicle control unit 40 so that the inter-vehicle distance to the preceding vehicle is held at a fixed distance based on vehicle speed.

The unsuitable area entry determining unit 104 determines whether the own vehicle is approaching and about to enter an unsuitable area, is travelling through an unsuitable area, or is about to exit an unsuitable area, based on the own vehicle position detected by the own vehicle position detecting unit 30 and the position of the unsuitable area registered in the unsuitable area DB 60.

The unsuitable area entry determining unit 104 then outputs, to the control target selecting unit 100, the control target value setting unit 102, and the control result evaluating unit 106, the positional relationship between the own vehicle and the unsuitable area, and the evaluation value of the unsuitable area obtained from the unsuitable area DB 60.

When notified by the unsuitable area entry determining unit 104 that the own vehicle is travelling through an unsuitable area, the control target selecting unit 100 determines that the driving assistance process cannot be suitably performed in this travelling area. The control target selecting unit 100 determines an assistance level for driving assistance, or in other words, whether to narrow down the control targets of the driving assistance process or to remove all targets from the control target, and suppresses driving assistance.

For example, when the control targets are narrowed down when PCS is performed as driving assistance, the control target is limited only to persons. In addition, when the periphery of an electronic toll collection (ETC) gate is an unsuitable area, the gate is removed from the control target, thereby suppressing the application of sudden braking force even when the own vehicle approaches the gate. As a result, a collision with a following vehicle can be avoided when the own vehicle passes through the ETC gate.

In a similar manner, when the own vehicle is at a railroad crossing, the crossing bar is removed from the control target, thereby suppressing the application of sudden braking force even should the crossing bar closes at the exit of the railroad crossing when the own vehicle is passing through a wide railroad crossing. As a result, even when the own vehicle collides with the crossing bar, the own vehicle can continue travelling and escape from the railroad crossing.

When notified by the unsuitable area entry determining unit 104 that the own vehicle is travelling through an unsuitable area, the control target value setting unit 102 determines that the driving assistance process cannot be suitably performed in this travelling area. The control target value setting unit 102 determines a control target value for suppressing driving assistance as the assistance level of the driving assistance process performed regarding the control target, based on the evaluation value of the unsuitable area.

For example, the control target value setting unit 102 sets the distance at which braking is started to avoid collision with an object ahead to be shorter than that when the own vehicle is in a normal travelling area that is not an unsuitable travelling area.

In addition, when notified by the unsuitable area entry determining unit 104 that the own vehicle is about to enter an unsuitable area or is about to exit an unsuitable area, the control target value setting unit 102 issues a command to the HMI output unit 50 to give notification by at least either image or audio that the own vehicle is about to enter an unsuitable area or is about to exit an unsuitable area.

The control result evaluating unit 106 determines whether or not the difference between a control target value estimated based on the operating state of the own vehicle obtained from the operating state detecting unit 20 and the control target value set by the control target value setting unit 102 is within an allowable range, and learns whether the travelling area through which the own vehicle is currently travelling is a suitable area or an unsuitable area for driving assistance.

In other words, when the difference between the control target value estimated from the operating state of the own vehicle and the control target value set by the control target value setting unit 102 exceeds the allowable range while the own vehicle is travelling through a travelling area that is not registered in the unsuitable area DB 60, the control result evaluating unit 106 newly registers the travelling area through which the own vehicle is currently travelling in the unsuitable area DB 60 as an unsuitable area. In this case, depending on the amount of difference between the control target value estimated from the operating state of the own vehicle and the control target value set by the control target value setting unit 102, the control result evaluating unit 106 sets, as appropriate, an evaluation value that indicates the degree by which driving assistance can be suitably performed.

Examples in which the control result evaluating unit 106 registers a travelling area in the unsuitable area DB 60 as an unsuitable area are described below.

(1) An erroneous recognition may be made that a preceding vehicle is present ahead of the own vehicle because a metal plate is covering a portion of an uphill road on which the own vehicle is travelling. Alternatively, an erroneous recognition may be made that a person is present ahead of the own vehicle because of the shape of paint painted on the road. In such cases, when the own vehicle approaches the metal plate or the paint on the road, driving assistance based on PCS may operate and braking force may be applied based on the control target value set by the control target value setting unit 102.

However, because another vehicle or a person is not actually present ahead of the own vehicle, the driver presses the accelerator pedal and passes through the area.

Based on the difference between the control target value set by the control target value setting unit 102 and the control target value estimated from the driving operation by the driver such as this, the control result evaluating unit 106 learns that the travelling area is an unsuitable area in which a metal plate is covering a portion of an uphill road and can easily be erroneously recognized as another vehicle, or the travelling area is an unsuitable area in which paint on the road can easily be erroneously recognized as a person, and registers the travelling area in the unsuitable area FB 60.

(2) Because a lane division line has been stripped away, the control target value setting unit 102 may determine that there is leeway on the side of the stripped lane division line and set a control target value to steer towards the side of the stripped lane division line. In response, the driver recognizes that the lane division line has been stripped away and performs a driving operation that does not change the steering angle. In this case, based on the difference between the control target value set by the control target value setting unit 102 and the control target value estimated from the driving operation by the driver, the control result evaluating unit 106 learns that the travelling area in which the lane division line has been stripped away is an unsuitable area, and registers the travelling area in the unsuitable area DB 60.

(3) When a reflective object that reflects the probe waves from the radar sensor 12 is present off the road, when a vehicle ahead of the own vehicle passes near the reflective object, the probe waves may be reflected back to the own vehicle from the vehicle ahead, via the reflective object. In this case, the positional information of the vehicle ahead may become erroneous as a result of the object erroneously detected in the direction of the reflective object and the vehicle ahead being erroneously coupled.

The control target value setting unit 102 determines that another vehicle is not present ahead and does not set a control target value that applies braking force even when the own vehicle approaches the other vehicle. However, the driver presses the brake pedal when the own vehicle approaches the vehicle ahead. In this case, based on the difference between the control target value set by the control target value setting unit 102 and the control target value estimated from the driving operation by the driver, the control result evaluating unit 106 learns that the travelling area is an unsuitable area in which, because a reflective object is present off the road, another vehicle that is present ahead may not be detected even when present, and registers the travelling area in the unsuitable area DB 60.

Conversely, when, instead of a reflective object, an object that diffusely reflects the probe waves is present near the own vehicle, an erroneous recognition may be made that another vehicle is present ahead regardless of another vehicle not being present, or the vehicle ahead may not be recognized at all. The control result evaluating unit 106 learns that a travelling area such as this is also unsuitable for driving assistance, and registers the travelling area in the unsuitable area DB 60.

(4) On a rough road having sharp bumps, the detection values from the various sensors tend to fluctuate significantly. Therefore, such areas are unsuitable for driving assistance that is based on the detection values from the various sensors. The control result evaluating unit 106 learns that a travelling area in which the detection values from the various sensors fluctuate significantly is an unsuitable area, and registers the travelling area in the unsuitable area DB 60.

(5) On a curved road of which the left/right slope angle is large in relation to the advancing direction of the own vehicle, whereas the detection values from the yaw rate sensor 22 and the steering angle sensor 26 indicate values similar to those for straight-ahead travelling, the advancing direction of the own vehicle may be curved based on the own vehicle position detected by the own vehicle detecting unit 30. The control result evaluating unit 106 learns that a travelling area such as this is an unsuitable area, and registers the travelling area in the unsuitable area DB 60.

Regarding the registration of unsuitable areas in the unsuitable area DB 60 described above, when the difference between the control target value estimated from the driving operation by the driver obtained from the operating state detecting unit 20 and the control target value set by the control target value setting unit 102 is within the allowable range while the own vehicle is travelling through a travelling area that is registered in the unsuitable area DB 60, the control result evaluating unit 106 determines that the travelling area through which the own vehicle is currently travelling is an area suitable for driving assistance. The control result evaluating unit 106 then removes the travelling area through which the own vehicle is currently travelling from the unsuitable area DB 60.

[Driving Assistance Process]

Figure 4:
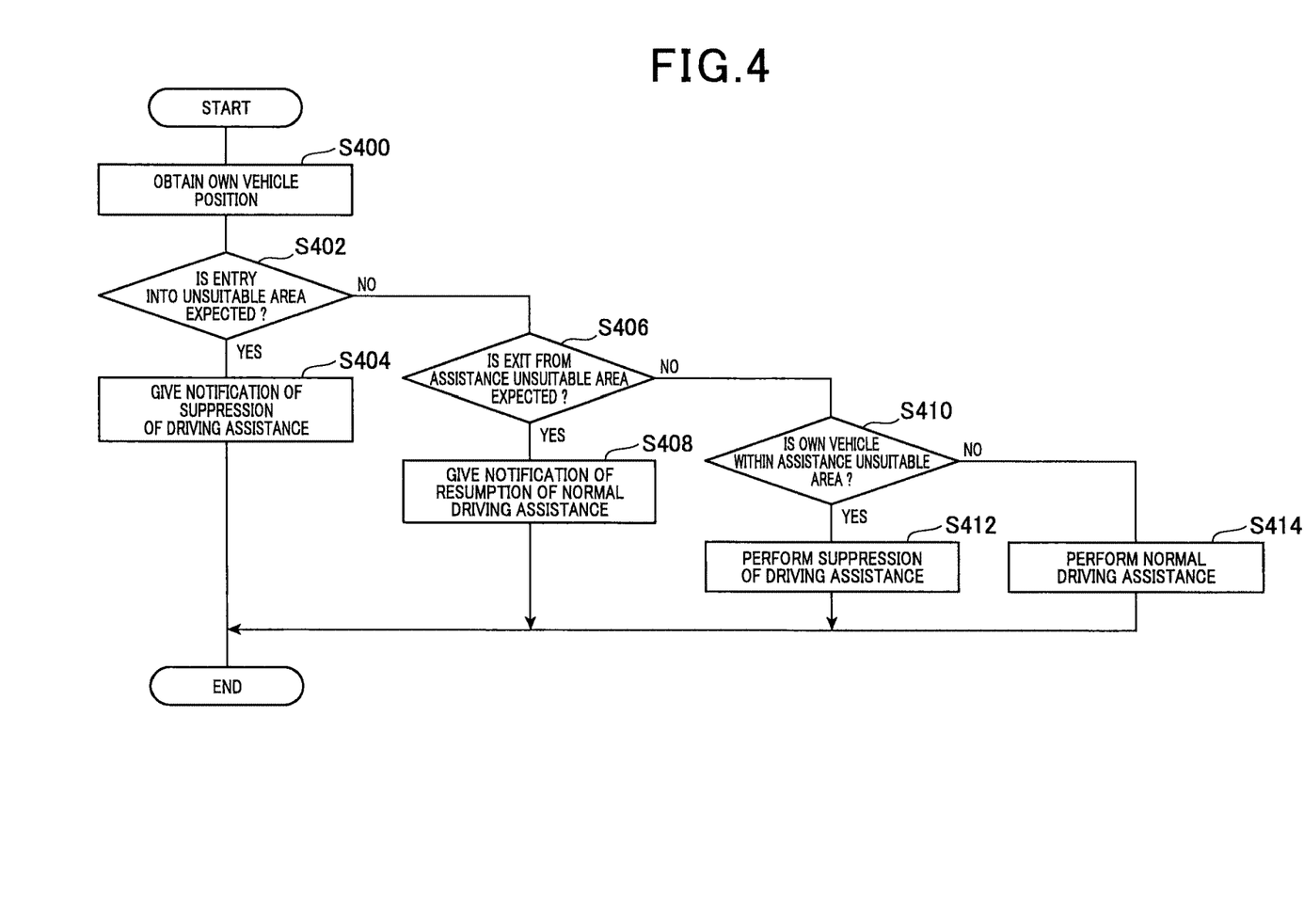
FIG. 4 is a flowchart showing a notification process for an unsuitable area.
Figure 5:
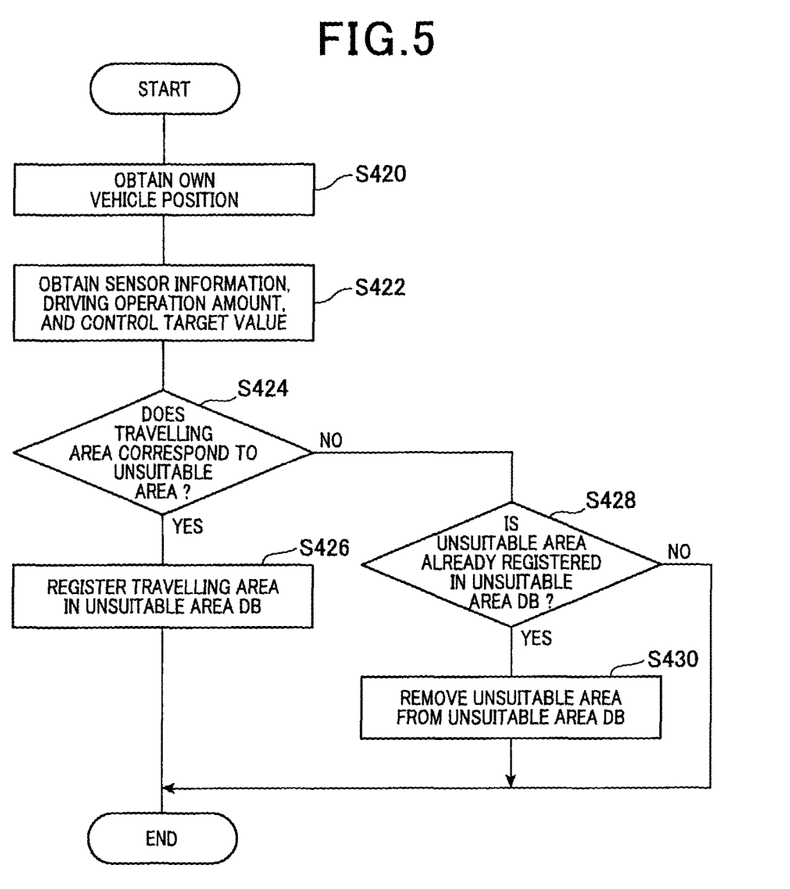
FIG. 5 is a flowchart showing a learning process for an unsuitable area.

Next, a notification process is shown in the flowchart in FIG. 4 as a driving assistance process performed by the driving assistance ECU 70. The learning process for an unsuitable area is shown in the flowchart in FIG. 5. The flowcharts in FIG. 4 and FIG. 5 are started at a time interval set in advance.

[Notification Process]

In FIG. 4, the driving assistance ECU 70 obtains the current own vehicle position from the own vehicle position detecting unit 30 (step S400), and determines whether or not the own vehicle is about to enter any of the unsuitable areas registered in the unsuitable area DB 60, by searching the unsuitable area DB 60 (step S402).

When determined that the own vehicle is about to enter an unsuitable area (Yes at step S402), the driving assistance ECU 70 determines the assistance level for driving assistance based on the evaluation value obtained from the unsuitable area DB 60 during the search of the unsuitable area DB 60 at step S402, and notifies the driver, by at least either image or audio using at least either the display 50 or the speaker 54, that driving assistance will be suppressed based on the assistance level (step S404).

When determined that the own vehicle is not about to enter an unsuitable area (No at step S402), the driving assistance ECU 70 determines whether or not the own vehicle is about to exit the unsuitable area through which the own vehicle is travelling (step S406).

When determined that the own vehicle is about to exit the unsuitable area (Yes at step S406), the driving assistance ECU 70 notifies the driver, by at least either image or audio using at least either the display 50 or the speaker 54, that the suppression of driving assistance will be terminated and normal driving assistance will be resumed (step S408).

When determined that the own vehicle is not about to enter an unsuitable area and is not about to exit an unsuitable area (No at step S402 or No at step S408), the driving assistance ECU 70 determines whether or not the own vehicle is travelling through an unsuitable area (step S410).

When determined that the own vehicle is travelling through an unsuitable area (Yes at step S410), the driving assistance ECU 70 determines the assistance level for driving assistance based on the evaluation value obtained from the unsuitable area DB 60 during the search of the unsuitable area DB 60 at step S402, and suppresses driving assistance based on the assistance level (step S412).

When determined that the own vehicle is not travelling through an unsuitable area (No at step S410), the driving assistance ECU 70 performs normal driving assistance (step S414).

[Learning Process]

In FIG. 5, the driving assistance ECU 70 obtains the current own vehicle position from the own vehicle position detecting unit 30 (step S420). The driving assistance ECU 70 then obtains the detection values of the various sensors and the driving operation amount by the driver from the travelling environment detecting unit 10 and the operating state detecting unit 20, and also obtains the control target value set by the driving assistance ECU 70 itself (step S422).

The driving assistance ECU 70 determines whether or not the travelling area through which the own vehicle is currently travelling is an unsuitable area, based on the sensor detection values, the driving operation amount, and the control target value obtained at step S422 (step S424). The driving assistance ECU 70 makes the determination regarding the unsuitable area based on the learning results of the control result evaluating unit 106 described above.

When determined that the travelling area is an unsuitable area (Yes at step S424), when the current travelling area is not registered in the unsuitable area DB 60, the driving assistance ECU 70 stores and registers the travelling area as an unsuitable area (step S426). Registration as an unsuitable area may be performed after a travelling area has been continuously determined to be an unsuitable area a predetermined number of times.

When determined that the travelling area is not an unsuitable area (No at step S424), the driving assistance ECU 70 determines whether or not the current travelling area is registered in the unsuitable area DB 60 as an unsuitable area (step S428).

When determined that the current travelling area is registered in the unsuitable area DB 60 as an unsuitable area regardless of being determined not to be an unsuitable area (Yes at step S428), the driving assistance ECU 70 removes the current travelling area from the unsuitable area DB 60 (step S430). Removal as an unsuitable area may be performed after the travelling area has been continuously determined not to be an unsuitable area a predetermined number of times.

[Effects]

According to the present embodiment described above, the following effects are achieved.

(1) The assistance level for driving assistance that is performed on the own vehicle is determined based on the evaluation value indicating the degree by which driving assistance can be suitably performed on the own vehicle in the travelling area of the own vehicle. Therefore, driving assistance at a suitable assistance level based on the evaluation value can be determined.

(2) Notification that driving assistance will be suppressed is given in advance before the own vehicle enters the unsuitable area. Therefore, the driver can take appropriate measures, such as turning off a driving assistance switch, in preparation for entry into the unsuitable area.

(3) The evaluation value indicating the degree by which driving assistance is suitable for the travelling area based on the travelling environment of the travelling area and the operating state obtained by the own vehicle is learned, and an unsuitable area is registered in the unsuitable area DB 60 or an unsuitable area registered in the unsuitable area DB 60 is removed.

As a result, a travelling area can be registered in the unsuitable area DB 60 if the travelling area is an unsuitable area for the own vehicle, even if the travelling area is not unsuitable for another vehicle.

In addition, even when the travelling area is an unsuitable area that is registered in the unsuitable area DB 60, for example, the travelling environment may change as a result of road construction, and the travelling area may no longer be an unsuitable area. In such cases as well, an unsuitable area that is registered in the unsuitable area DB 60 can be removed based on the travelling environment of the travelling area and the operating state obtained by the own vehicle.

Other Embodiments

An embodiment of the present disclosure is described above. However, the present disclosure is not limited to the above-described embodiment and various embodiments are possible.

According to the above-described embodiment, when the own vehicle is about to enter an unsuitable area or about to exit an unsuitable area, the driver is notified through the display 52 or the speaker 54, and driving assistance is suppressed while the own vehicle is travelling through the unsuitable area.

However, in the present disclosure, only either of the notification regarding entry into and exit from an unsuitable area, and the suppression of driving assistance during travelling through the unsuitable area may be performed.

In addition, at least only notification of entry into the unsuitable area, among the notifications of entry into and exit from the unsuitable area, may be performed.

According to the above-described embodiment, the driving assistance ECU 70 gives notification in advance that driving assistance will be suppressed before the own vehicle enters the unsuitable area at step S404 in FIG. 4, and when the own vehicle enters the unsuitable area, issues a command to the vehicle control unit 40 and suppresses driving assistance at step S412 in FIG. 4. However, at step S404 in FIG. 4, the driving assistance ECU 70 may give notification in advance of the evaluation value of the unsuitable area, instead of giving notification in advance of the suppression of driving assistance before entry into the unsuitable area, and may perform a process in which a command to suppress driving assistance is not issued to the vehicle control unit 40 even when the own vehicle enters the unsuitable area.

In addition, the process for suppressing driving assistance in the unsuitable area is described according to the above-described embodiment. However, a travelling area that is more suitable for driving assistance than normal may be registered in a DB as a suitable area, and the degree of driving assistance in the suitable area may be higher than normal.

In addition, the unsuitable area DB 60 may not be mounted in the vehicle, but rather, set as a cloud DB that is freely accessible by the user of the vehicle.

A function provided by a single constituent element according to the above-described embodiment may be dispersed as a plurality of constituent elements, or a function provided by a plurality of constituent elements may be integrated into a single constituent element.

In addition, at least a part of the configuration according to the above-described embodiment may be replaced with a known configuration having similar functions. In addition, a part of the configuration according to the above-described embodiment may be omitted as long as the problem can be solved.

Any embodiment included in the technical concept specified only by the wordings of the scope of claims is an embodiment of the present disclosure.

The present disclosure can also be actualized by various modes in addition to the above-described driving assistance ECU 70, such as a system of which a constituent element is the driving assistance apparatus, a program enabling a computer to function as the driving assistance apparatus, a recording medium on which the program is stored, and a driving assistance method.

Among the processes performed by the driving assistance ECU 70, the processes at steps S400 and S420 correspond to position obtaining means (the unsuitable area entry determining unit 104). The process at steps S402 corresponds to evaluation value obtaining means (the unsuitable area entry determining unit 104). The process at step S404 corresponds to notifying means (the control target value setting unit 102). The process at step S412 corresponds to assistance level determining means (the control target value setting unit 102). The process at S422 correspond to travelling environment obtaining means and operating state obtaining means (the control target selecting unit 100). The process at steps S424 corresponds to evaluation value learning means (the control result evaluating unit 106). The processes at steps S424 and S430 correspond to managing means (the control result evaluating unit 106).

What is claimed is:

1. A driving assistance apparatus mounted to an own vehicle, the driving assistance apparatus comprising:
a storage; and
a processor, wherein the processor is configured to:
store, in the storage, a position of the own vehicle, an assistance type of driving assistance performed on the own vehicle, and an evaluation value based on the position of the own vehicle and the assistance type of driving assistance performed on the own vehicle, the evaluation value indicating a degree by which driving assistance can be suitably performed on the own vehicle in a travelling area through which the own vehicle is presumed to travel, the evaluation value becoming lower as the travelling area becomes more unsuitable for driving assistance;
obtain a current position of the own vehicle;
obtain the evaluation value from the storage based on the obtained current position of the own vehicle;
determine, when the evaluation value indicates that the driving assistance is unsuitable, an assistance level such that the driving assistance is suppressed, the assistance level indicating a degree by which driving assistance is performed on the own vehicle; and
give notification in advance to a notification apparatus, of the determined assistance level before the own vehicle enters the travelling area.

2. A driving assistance apparatus mounted to an own vehicle, the driving assistance apparatus comprising:
a storage; and
a processor, wherein the processor is configured to:
store, in the storage, a position of the own vehicle, an assistance type of driving assistance performed on the own vehicle, and an evaluation value based on the position of the own vehicle and the assistance type of driving assistance performed on the own vehicle, the evaluation value indicating a degree by which driving assistance can be suitably performed on the own vehicle in a travelling area of the own vehicle including a current position of the own vehicle, the evaluation value becoming lower as the travelling area becomes more unsuitable for driving assistance;

obtain the current position of the own vehicle;

obtain the evaluation value from the storage based on the obtained current position of the own vehicle; and determine, when the evaluation value indicates that the driving assistance is unsuitable, an assistance level such that the driving assistance is suppressed, the assistance level indicating a degree by which driving assistance is performed in the own vehicle.

3. The driving assistance apparatus according to claim 1, wherein
the processor is further configured to:
obtain a travelling environment in the travelling area through which the own vehicle travels;
obtain an operating state in the own vehicle;
learn the evaluation value in the travelling area based on the obtained travelling environment and the obtained operating state;
manage the travelling environment which is registered in the storage based on the learned evaluation value; and
obtain the evaluation value which is registered in the storage.

4. The driving assistance apparatus according to claim 2, wherein
the processor is further configured to:
obtain a travelling environment in the travelling area through which the own vehicle travels;
obtain an operating state in the own vehicle;
learn the evaluation value in the travelling area based on the obtained travelling environment and the obtained operating state;
manage the travelling environment which is registered in the storage based on the learned evaluation value; and
obtain the evaluation value which is registered in the storage.

5. A driving assistance method comprising:
storing, in a database mounted to an own vehicle, a position of the own vehicle, an assistance type of driving assistance performed on the own vehicle, and an evaluation value based on the position of the own vehicle and the assistance type of driving assistance performed on the own vehicle, the evaluation value indicating a degree by which driving assistance can be suitably performed on the own vehicle in a travelling area through which the own vehicle is presumed to travel, the evaluation value becoming lower as the travelling area becomes more unsuitable for driving assistance;

obtaining, by a driving assistance apparatus mounted to the own vehicle, a current position of the own vehicle;

obtaining, by the driving assistance apparatus, the evaluation value from the database based on the obtained current position of the own vehicle;

determining, when the evaluation value indicates that the driving assistance is unsuitable, an assistance level such that the driving assistance is suppressed, the assistance level indicating a degree by which driving assistance is performed on the own vehicle; and giving notification in advance to a notification apparatus, of the determined assistance level before the own vehicle enters the travelling area.

6. A driving assistance method comprising:
storing, in a database mounted to an own vehicle, a position of the own vehicle, an assistance type of driving assistance performed on the own vehicle, and an evaluation value based on the position of the own vehicle and the assistance type of driving assistance performed on the own vehicle, the evaluation value indicating a degree by which driving assistance can be suitably performed on the own vehicle in a travelling area of the own vehicle including a current position of the own vehicle, the evaluation value becoming lower as the travelling area becomes more unsuitable for driving assistance;

obtaining, by a driving assistance apparatus mounted to the own vehicle, the current position of the own vehicle;

obtaining, by the driving assistance apparatus, the evaluation value from the storage based on the obtained current position of the own vehicle;

determining, when the evaluation value indicates that the driving assistance is unsuitable, an assistance level such that the driving assistance is suppressed, the assistance level indicating a degree by which driving assistance is performed on the own vehicle.

7. The driving assistance apparatus according to claim 1, wherein the assistance type of driving assistance performed on the own vehicle includes at least one of lane keep assistance and pre-crash safety.

* * * * *